Nov. 18, 1947.   E. MARTIN   2,431,184
COMPOSITE BLADE
Filed Sept. 23, 1943
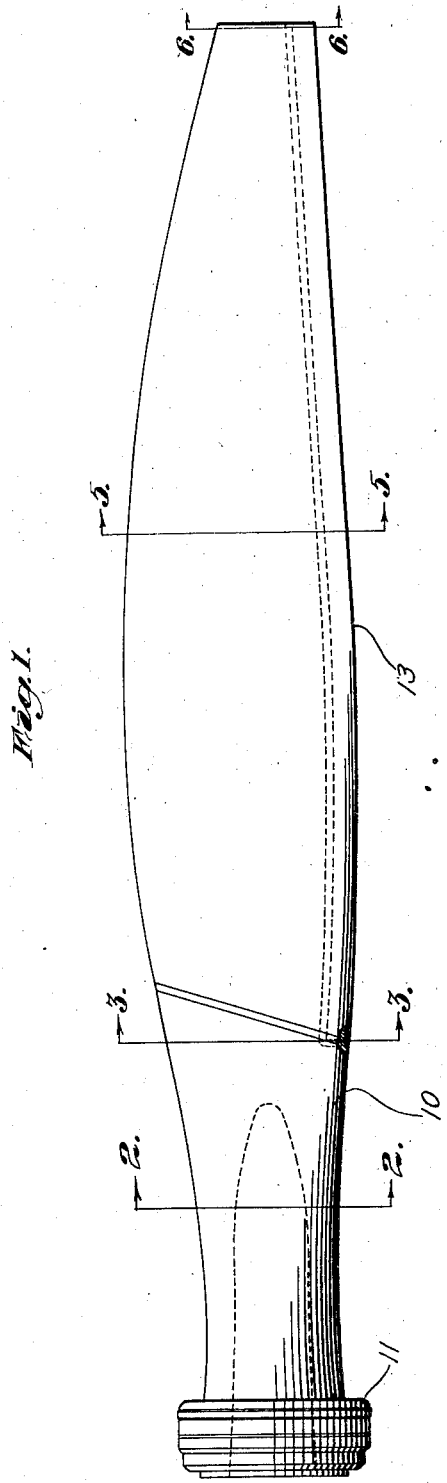
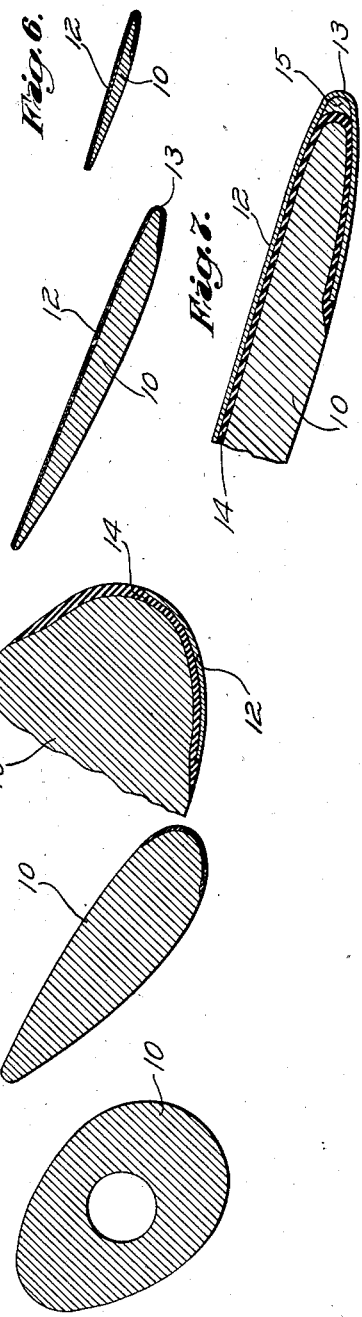
INVENTOR
Erie Martin
BY Charles L. Shelton
Attorney Patented Nov. 18, 1947

2,431,184

UNITED STATES PATENT OFFICE 2,431,184

COMPOSITE BLADE

Erle Martin, West Hartford, Conn., assignor to United Aircraft Corporation, East Hartford, Conn., a corporation of Delaware Application September 23, 1943, Serial No. 503,519

2 Claims. (Cl. 170—159)

This invention relates to blades for aircraft propellers and more particularly to a composite blade having a body member of solid metal such as cast or forged aluminum or other light metal alloy and a strip of abrasion resisting metal, such as stainless steel, conforming to one face of the body member and extending around the leading edges of the blade.

The primary object of the invention is to provide a composite blade for aircraft propellers that will be rugged, easily made with present standard equipment to aerodynamic form and which will have improved vibration damping qualities as well as improved wear and abrasive resisting qualities on the active or pressure side of the blade and at the leading edge of the blade throughout the active length of the blade.

Another object of the invention is to provide an interposed thin sheet of resilient non-metallic material such as semi-vulcanized rubber between the sheet metal strip and the body portion of the blade, this non-metallic material being bonded on its opposite surfaces directly to the body member of the blade and to the metal sheet to retain the abrasive resistant metal sheet uniformly spaced from the cast or forged metal forming the body of the blade throughout the surface of the sheet metal.

Other objects and advantages will be apparent from the specification and claims and from the drawing which illustrates what is now considered to be a preferred embodiment of the invention.

In the drawings,

Fig. 1 is a longitudinal view shown in plan form of a propeller blade made in accordance with the present invention.

Figs. 2, 3, 5 and 6 are transverse sectional views taken on the planes of lines 2—2, 3—3, 5—5, and 6—6 in Fig. 1 and shown upon a somewhat enlarged scale.

Fig. 4 is an enlarged view of a portion of Fig. 3, and also shown in section, and Fig. 7 is an enlarged view of a portion of Fig. 6 and also shown in section.

In its preferred form the invention may include the following principal parts: First, a body member of cast or forged alloy preferably of aluminum or other light metal forming the major member of the blade and the member sustaining the centrifugal and aerodynamic stresses to which the blade is subjected; second, a thin strip of sheet metal preferably of stainless steel or other abrasive resistant metal applied to the flat or pressure side of the blade and extending around its leading edge; and third, a thin layer of compressive and resilient sheet material such as semi-vulcanized rubber interposed between the body member and the covering sheet of metal strip.

Referring more in detail to the figures of the drawing, there is provided a body member 10 preferably of solid cast or forged metal forming the principal member of the composite blade. As shown in Fig. 1, this member extends from the shank to the tip of the blade and if desired may be hollow for a short distance adjacent the shank end as indicated by dotted lines. At the shank end also there is formed an enlarged hub portion 11 for attaching the blade to a central housing for the propeller (not shown). Beyond the shank portion and extending the entire length of the active or airfoil length of the blade to the blade tip is applied on one side a thin strip of covering material 12. This strip 12 may preferably be sheet metal such as stainless steel conforming to the flat or pressure surface of the blade and extending around the leading edge 13 to cover a small portion of the camber or suction surface of the blade.

Interposed between the surface of the covering strip 12 of sheet metal and the metal forming the body portion 10 of the blade is a sheet 14 of non-metallic material. This material 14 may be compressive and resilient such as semi-vulcanized rubber, phenolic plastic material or other material having limited elasticity and pliability. This material closely adheres to the surfaces of the body member 10 and covering strip 12 and preferably may be directly bonded to each of these materials under heat and pressure or otherwise. When in completed built-up form the interposed layer of non-metallic material is preferably subjected to compression and serves to retain the sheet metal covering strip 12 firmly against but spaced from the body member 10 at a slight and uniform distance.

Adjacent the tip portion of the blade at the fold of the sheet metal 12 forming the leading edge of the blade, there may be inserted a metal filler piece 15 between the inner surface of the sheet 12 and the outer surface of the interposed sheet of compressive material 14. By this means, the leading edge of the blade throughout its active length may be a straight line, and the leading edge reinforced.

By reason of the composite or built-up structure of the blade for a substantial portion of its active length and particularly at the tip, the vibrations of the blade at high rotative speeds during active use are partially but substantially damped. This damping effect is due to the vibrations serving to alternately stress the opposite side portions of the body member. Due to the sheet metal strip being bonded to a surface of an interposed layer of resilient non-metallic material and thus spaced slightly from the body member 10 to which the opposite surface of the interposed material is bonded, these vibrations stress this interposed material, which has appreciable thickness, in shear. The stresses are reversed with each vibration thus tending to restore the vibrating mass to its neutral or non-vibrating position and materially damp the vibrations.

It is to be understood that the invention is not limited to the specific embodiment herein illustrated and described but may be used in other forms without departure from the spirit of the invention as defined by the following claims.

I claim:

1. In combination with a metal propeller blade, means for protecting said blade against abrasion, and for damping vibrations in said blade, comprising an abrasion resisting metal sheet covering one side and the leading edge of said blade said sheet being coextensive in width with said blade and extending throughout the active airfoil length of said blade and a resilient compressive non-metallic bonding material between said blade and sheet adhesively securing said metal sheet to said metal blade for damping vibrations by distortion of said bonding material due to vibration induced relative movement of said blade and sheet, said bonding material being the sole securing means between said sheet and said blade.

2. In combination with an aluminum alloy propeller blade, means for protecting said blade against abrasion and for damping vibrations in said blade, comprising an abrasion resisting steel sheet covering one side and the leading edge of said blade, said steel sheet being coextensive in width with said blade and extending throughout the active airfoil length of said blade, and a resilient compressive phenolic plastic bonding material between said blade and said steel sheet adhesively securing said steel sheet to said aluminum alloy blade for damping vibrations by distortion of said bonding material due to vibration induced relative movement of said blade and sheet, said bonding material being the sole securing means between said sheet and said blade.

ERLE MARTIN.

REFERENCES CITED

The following references are of record in the file of this patent:

UNITED STATES PATENTS

| Number | Name | Date |
|---|---|---|
| 1,842,178 | Kempton | Jan. 19, 1932 |
| 2,292,089 | Reid | Aug. 4, 1942 |
| 2,312,219 | Sensenich | Feb. 23, 1942 |

FOREIGN PATENTS

| Number | Country | Date |
|---|---|---|
| 424,969 | Great Britain | Feb. 28, 1935 |
| 452,841 | Great Britain | Aug. 31, 1936 |
| 457,733 | Great Britain | Dec. 4, 1936 |
| 492,804 | Great Britain | Sept. 27, 1938 |
| 541,078 | Great Britain | Nov. 12, 1941 |
| 706,001 | Germany | May 15, 1941 |
| 840,258 | France | Jan. 11, 1939 |